United States Patent
Li et al.

(10) Patent No.: US 12,438,657 B2
(45) Date of Patent: Oct. 7, 2025

(54) GENERIC RESOURCE MODEL FOR OBSERVABILITY

(71) Applicant: Telefonaktiebolaget LM Ericsson (publ), Stockholm (SE)

(72) Inventors: Haomin Li, Kanata (CA); Geoffrey McHardy, Carp (CA); Ning Guo, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 463 days.

(21) Appl. No.: 17/926,232

(22) PCT Filed: May 29, 2020

(86) PCT No.: PCT/IB2020/055141
§ 371 (c)(1),
(2) Date: Nov. 18, 2022

(87) PCT Pub. No.: WO2021/240222
PCT Pub. Date: Dec. 2, 2021

(65) Prior Publication Data
US 2023/0198689 A1     Jun. 22, 2023

(51) Int. Cl.
*H04L 5/00* (2006.01)
(52) U.S. Cl.
CPC .......... *H04L 5/0007* (2013.01); *H04L 5/0048* (2013.01)
(58) Field of Classification Search
CPC .............. H04L 5/0007; H04L 5/0048
See application file for complete search history.

(56) References Cited

U.S. PATENT DOCUMENTS

| | | | |
|---|---|---|---|
| 2018/0288781 A1* | 10/2018 | Akkarakaran | H04W 72/0446 |
| 2019/0021045 A1 | 1/2019 | Kim et al. | |
| 2019/0312621 A1* | 10/2019 | Nam | H04W 72/23 |
| 2021/0345387 A1* | 11/2021 | Gurelli | H04L 5/0053 |

OTHER PUBLICATIONS

International Search Report and Written Opinion dated Feb. 24, 2021 issued in PCT Application No. PCT/IB2020/055141, consisting of 13 pages.
Dahlman Erik et al., 5G NR The Next Generation Wireless Access Technology; Aug. 17, 2018, consisting of 400 pages.
3GPP TS 38.211 V15.6.0 (Sep. 2019) 3rd Generation Partnership Project; Technical Specification Group Radio Access Network; NR; Physical Channels and Modulation (Release 15), consisting of 97 pages.
3GPP TS 38.214 V15.6.0 (Jun. 2019) 3rd Generation Partnership Project; Technical Specification Group Radio Access Network; NR; Physical Layer Procedures for Data (Release 15), consisting of 105 pages.

* cited by examiner

*Primary Examiner* — Duc C Ho
(74) *Attorney, Agent, or Firm* — Sonoda & Kobayashi Intellectual Property Law; Sarvajit S. Patil

(57) ABSTRACT

According to one or more embodiments, a network node is provided. The network node includes processing circuitry configured to: determine a first resource block per symbol (RBSYM) quantity of a first portion of a frequency-time resource grid; determine a second RBSYM quantity of a second portion of the frequency-time resource grid, the second portion being associated a different Orthogonal Frequency-Division Multiplexing, OFDM, numerology than the first portion; and perform at least one action based at least in part on the first RBSYM quantity and the second RBSYM quantity.

20 Claims, 13 Drawing Sheets

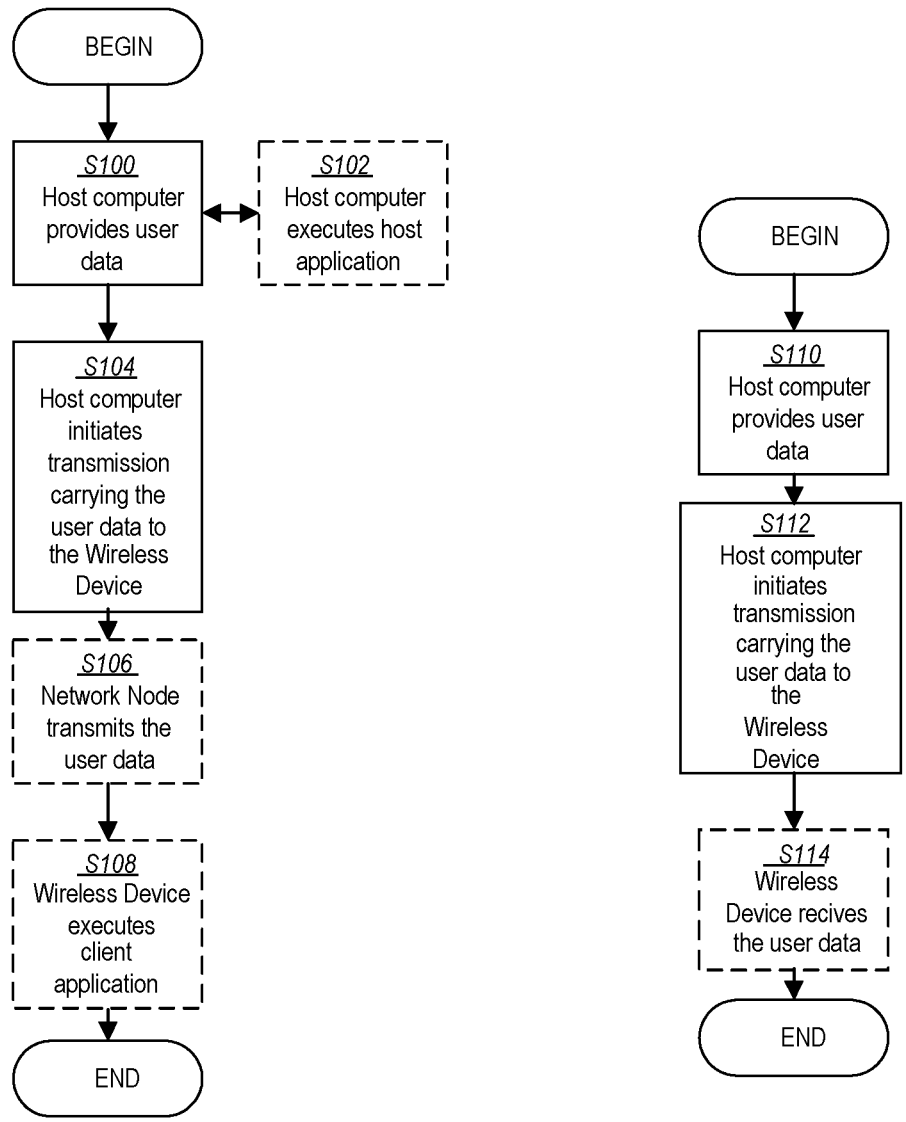

GENERIC RESOURCE MODEL FOR OBSERVABILITY

CROSS-REFERENCE TO RELATED APPLICATION

This application is a Submission Under 35 U.S.C. § 371 for U.S. National Stage Patent Application of International Application Number: PCT/IB2020/055141, filed May 29, 2020 entitled "GENERIC RESOURCE MODEL FOR OBSERVABILITY," the entirety of which is incorporated herein by reference.

TECHNICAL FIELD

The present disclosure relates to wireless communications, and in particular, to quantifying resource utilization and/or spectrum usage based on resource block per symbol, RBSYM, units.

BACKGROUND

The introduction of 5$^{th}$ Generation (5G, also referred to as Next-generation Radio or NR) by the Third Generation Partnership Project (3GPP) provides with a re-designed physical layer to facilitate the different targeted use cases. Examples of such use cases include mobile broadband (MBB), ultra-reliable low latency (URLLC) and machine type communication (MTC) which have different requirements on peak throughput, latency, etc.

One feature that is implemented in all of these use cases is the introduction of multiple OFDM numerologies, as in table 4.2-1 from 3GPP TS 38.211 v15.6.0 shown below:

| $\mu$ | $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal | a $\Delta f$ is the subcarrier spacing in frequency domain which may depend on the numerology chosen, the distance between two adjacent OFDM carrier is varied and may be 15, 30, 60, 120 and 240 KHz.

Correspondingly, in the time domain, the relationship among OFDM numerology ($\mu$), number of OFDM symbols per slot ($N_{symb}^{slot}$) and number of slot per subframe ($N_{slot}^{subframe,\mu}$) is defined as in Table 4.3.2-1 of 3GPP TS 38.211 v15.6.0, for normal cyclic prefix:

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A subframe has a fixed duration of 1 ms, and therefore depends on the numerology chosen, the OFDM symbol duration is $$\frac{1}{14}, \frac{1}{28}, \frac{1}{56}, \frac{1}{112} \text{ and } \frac{1}{224} \text{ ms,}$$

correspondingly.

The OFDM numerology, in the frequency domain, as well as OFDM symbol in the time domain form a resource grid, per numerology, which provides the basic resource unit referred to as a Resource Element (RE) that all NR physical signals and channels are mapped onto. A RE is defined as a single subcarrier across a single symbol where the actual frequency and time is adjusted according to the above described OFDM Numerology.

3GPP has further introduced the concept of a Resource Block (RB), which is defined as 12 consecutive subcarriers in the frequency domain as described in wireless communication standards such as section 4.4.4.1 of 3GPP TS 38.211 v15.6.0. A RB is the smallest granularity of resources in the frequency domain that is assignable to different physical channels and different wireless devices during the dynamic process of resource allocation.

As examples, two RBs of numerology 0 and 1, in a time duration of 1 subframe (1 ms) are illustrated in FIG. 1.

The multiple resource grids defined by different numerologies in the same cell or carrier, which is defined by a given carrier frequency and bandwidth, can be utilized simultaneously by the scheduler at the network node to assign resources to the wireless devices and other usages.

As illustrated FIG. 1, the resource grid which is used by the network node to assign channel resources can vary dramatically between different numerologies, potentially even within the same carrier frequency.

Another enabler for NR to support multiple different use cases, compared to earlier standardized wireless communication technologies such as long term evolution (LTE), is the flexibility in physical layer signals and channels allocation. Such flexibility may be supported by three characteristics of NR, including:

First, nearly all physical signal and channel configurations are wireless device specific, which means the same frequency-time resource from a given grid can be assigned to different signals and channels for different wireless devices. For instance, a set of frequency-time resources configured for the physical downlink control channel (PDCCH) for wireless device 1, can be reused by wireless device 2 for its physical downlink shared channel (PDSCH).

Second, physical control and shared channel configurations are very flexible with respect to starting symbol, duration in time as well as number of resource blocks (RBs) in frequency when mapped to frequency-resource grid. For instance, a wireless device may be configured with PDSCH mapping type A from symbol 1 to 13 for a given numerology and another wireless device may be configured with PDSCH mapping type B from symbol 5 to 8.

Third, Bandwidth Part (BWP) is defined as a new feature in NR. Within a system bandwidth, multiple BWPs can be configured with different numerologies for different purposes. Then, the PRB in the different BWPs occupies a different amount of spectrum and lasts in different durations in time. There are various use cases that can be enabled with the flexibility provided by BWP. One such use case relates to the feature that different numerologies in different BWPs result in different slot length that can be utilized for applications where different over the air latency may be required.

Many NR features explore such flexibility to allocate frequency-time resources to different wireless devices in different ways in dynamic and/or semi-static fashion.

FIG. 2 is a diagram of an example of how a given frequency-time resource are utilized differently in a dynamic manner, driven by the traffic pattern of the wireless devices. A region from configured PDSCH for wireless device A can be dynamically allocated to wireless device B for its control traffic (PDCCH) and data traffic (PDSCH). FIG. 2 is conceptual example, and may not be valid for all 3GPP physical channel and procedure definitions.

One of the key performance indicators (KPIs) that wireless operators are interested in is the utilization of the physical resource of each deployed wireless cell/sector which is directly tied to the rate of return on investment that the wireless operators spent on the acquisition of expensive licensed spectrums as well as all costs associated with the deployment of the wireless networks.

In previous generations of wireless communications, tracking and reporting the utilization of the physical resources was relatively straight forward. Using LTE as an example, nearly all signals and channels are cell specific, i.e., all wireless devices share the same view of the resource allocations within a cell the entire time, and, there is only a single OFDM numerology applicable where the numerology corresponds to a single frequency-time resource grid that is the same as the one for numerology=0 in NR. Some aspects for deriving resource utilizations can be defined as follows:

Unit of frequency-time resource for accounting: LTE has a statically defined Physical Resource Block (PRB) that corresponds to 180 KHz in the frequency domain and 1 ms in the time domain where dynamic resource assignment of physical channels to different wireless devices can always be tracked.

Static or very limited flexibility describes how a given channel is mapped to the frequency-time resource grid. For example, in LTE, the physical downlink control channel (PDCCH) always starts from symbol 0 and occupies all frequency domain resource in the slot and is limited to within the first three or four symbols. Also, LTE PDSCH always starts from the first symbol after PDCCH and spans all the rest of the symbols in the subframe as well taking all frequency domain resources as illustrated in FIG. 3 that is a diagram of LTE PDCCH and PDSCH allocations. Also, all wireless devices in the same cell share the same view of resource assignment to channels. This makes defining what resources are available per channel in a cell quite clear.

Since resource utilization is defined as an amount of frequency-time resources (RBs) utilized for a given channel as the result of a scheduling decision over the total amount of cell frequency-time resources (RBs) available to the channel, the resource utilization KPI for a channel of interest can therefore be obtained in a relatively straight forward manner.

However, given the above described flexibilities of NR, reusing the same approach for determining resource utilization as described in previous generations of wireless communication such as LTE becomes a challenge as reusing the same approach does not easily map to NR, and does not provide an accurate account of resource utilization.

SUMMARY

Some embodiments advantageously provide methods, systems, and apparatuses for quantifying resource utilization and/or spectrum usage based on RBSYM. In one or more embodiments, RBSYM is a unit that is configured to represent a resource allocation for one or more layer 1 (e.g., NR layer 1) channels and signals (e.g., channels and signals based on a resource grid of OFDM signals), regardless of numerology and configuration complexity or for a plurality of numerologies and/or a plurality of configuration complexities.

The teachings the disclosure may provide one or more of the following benefits:

The unit of RBSYM for frequency-time resources is universal across all resource grids of different numerologies, which makes it possible to perform direct additions of resources allocated to different resource grids to get an overall view from the cell perspective. Further, RBSYM may be converted to RB-slot, i.e., the PRB equivalence from LTE, for any desired numerology, for any preferred customized display. This unit of RBSYM is numerology and channel independent making it an ideal basis for tracking air resource utilization;

The methodology for accounting of resource utilization enables network operators to embrace the full flexibility of NR, i.e., all frequency-time resources are available to all physical channels, where a network operator can influence the utilization of a channel by introducing one or more modifications to the semi-static channel configurations for optimized overall performance using the designated congestion counters as reference;

The method for measuring the spectral efficiency of physical channels is numerology and channel independent making it a basis for flexible and dynamic control of network features;

While observability down to the RE level is possible, RBSYM provides a better level of abstraction which has better counter scaling across all numerologies and carrier bandwidths, especially given that dynamic resource allocation allowed by NR that is typically at the RB level in frequency domain, e.g., resource allocation for PDSCH and PUSCH.

According to one aspect of the disclosure, a network node is provided. The network node includes processing circuitry configured to: determine a first resource block per symbol (RBSYM) quantity of a first portion of a frequency-time resource grid; determine a second RBSYM quantity of a second portion of the frequency-time resource grid, the second portion being associated a different Orthogonal Frequency-Division Multiplexing, OFDM, numerology than the first portion; and optionally perform at least one action based at least in part on the first RBSYM quantity and the second RBSYM quantity.

According to one or more embodiments, at least one mathematical operation is directly performed using the first RBSYM quantity and the second RBSYM quantity. According to one or more embodiments, the at least one mathematical operation includes at least one of addition and subtraction. According to one or more embodiments, the processing circuitry is further configured to convert the first RBSYM quantity to a first resource block (RB)-slot quantity and the second RBSYM quantity to a second RB-slot quantity.

According to one or more embodiments, the processing circuitry is further configured to convert the first RBSYM quantity to a first control channel element (CCE) quantity and the second RBSYM quantity to a second CCE quantity. According to one or more embodiments, the first RBSYM quantity corresponds to a first CORESET and the second RBSYM quantity corresponds to second CORESET different from the first CORESET. According to one or more embodiments, the first RBSYM quantity corresponds to one of available and used resources in physical downlink control channel, PDCCH where the second RBSYM quantity corresponds to one of available and used resources in a physical downlink shared channel, PDSCH.

According to one or more embodiments, the first RBSYM quantity corresponds to used resources in a physical downlink shared channel, PDSCH, Type B scheduling where the second RBSYM quantity corresponds to used resources in a physical downlink control channel, PDCCH, Type B scheduling. According to one or more embodiments, the at least one action includes modifying a channel configuration to reduce congestion. According to one or more embodiments, the processing circuitry is further configured to determine a resource utilization based at least on the first RBSYM quantity and the second RBSYM quantity.

According to another aspect of the disclosure, a method implemented in a network node is provided. A first resource block per symbol (RBSYM) quantity of a first portion of a frequency-time resource grid is determined. A second RBSYM quantity of a second portion of the frequency-time resource grid is determined where the second portion being associated a different Orthogonal Frequency-Division Multiplexing, OFDM, numerology than the first portion. At least one action is optionally performed based at least in part on the first RBSYM quantity and the second RBSYM quantity.

According to one or more embodiments, at least one mathematical operation is directly performed using the first RBSYM quantity and the second RBSYM quantity. According to one or more embodiments, the at least one mathematical operation includes at least one of addition and subtraction. According to one or more embodiments, the first RBSYM quantity is converted to a first resource block (RB)-slot quantity and the second RBSYM quantity to a second RB-slot quantity.

According to one or more embodiments, converting the first RBSYM quantity is converted to a first control channel element (CCE) quantity and the second RBSYM quantity to a second CCE quantity. According to one or more embodiments, the first RBSYM quantity corresponds to a first CORESET and the second RBSYM quantity corresponds to second CORESET different from the first CORESET. According to one or more embodiments, the first RBSYM quantity corresponds to one of available and used resources in physical downlink control channel, PDCCH where the second RBSYM quantity corresponds to one of available and used resources in a physical downlink shared channel, PDSCH.

According to one or more embodiments, the first RBSYM quantity corresponds to used resources in a physical downlink shared channel, PDSCH, Type B scheduling where the second RBSYM quantity corresponds to used resources in a physical downlink control channel, PDCCH, Type B scheduling. According to one or more embodiments, the at least one action includes modifying a channel configuration to reduce congestion. According to one or more embodiments, a resource utilization is determined based at least on the first RBSYM quantity and the second RBSYM quantity.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

DETAILED DESCRIPTION

Figure 1:
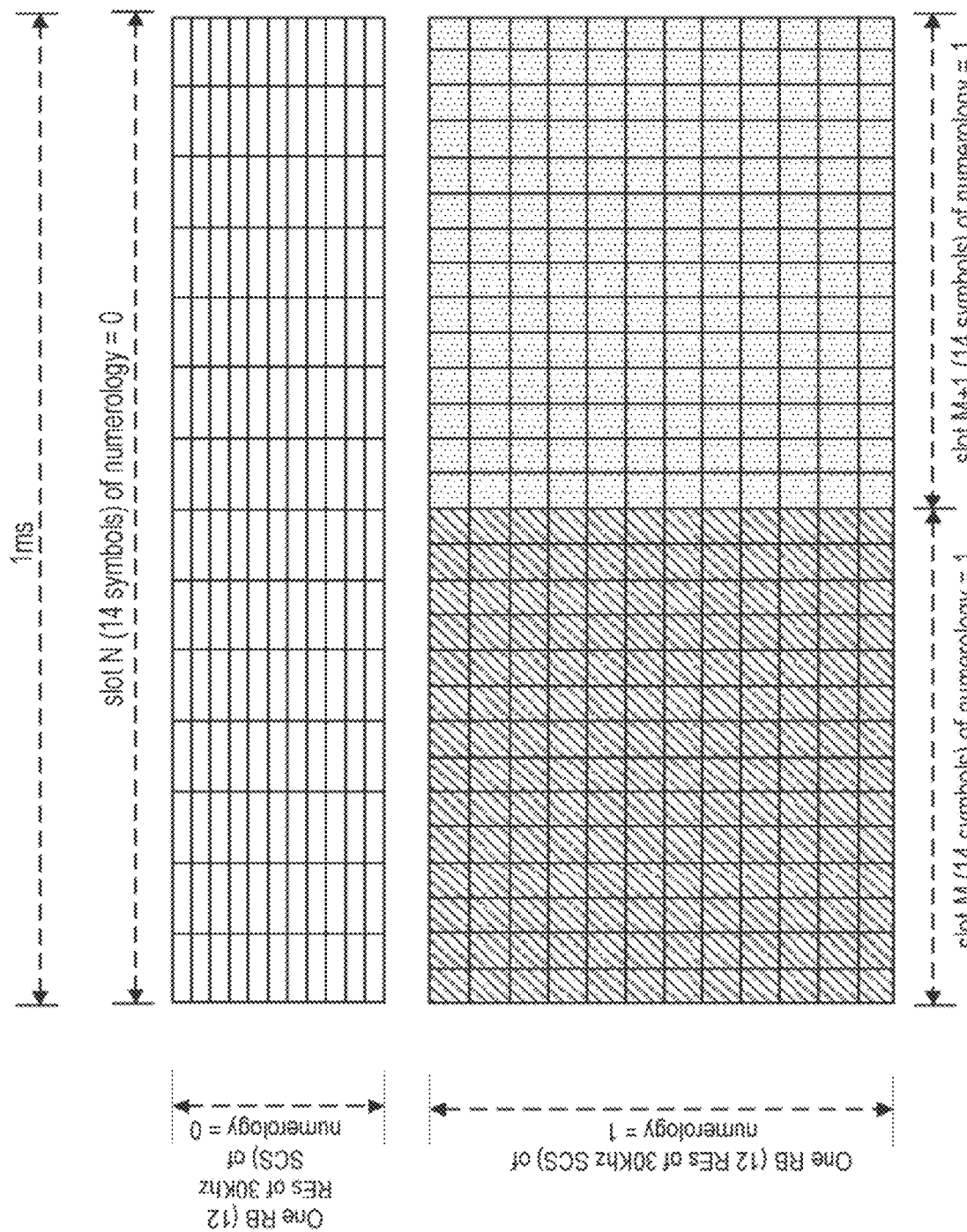
FIG. 1 is a diagram of RBs in different resource grids.
Figure 2:
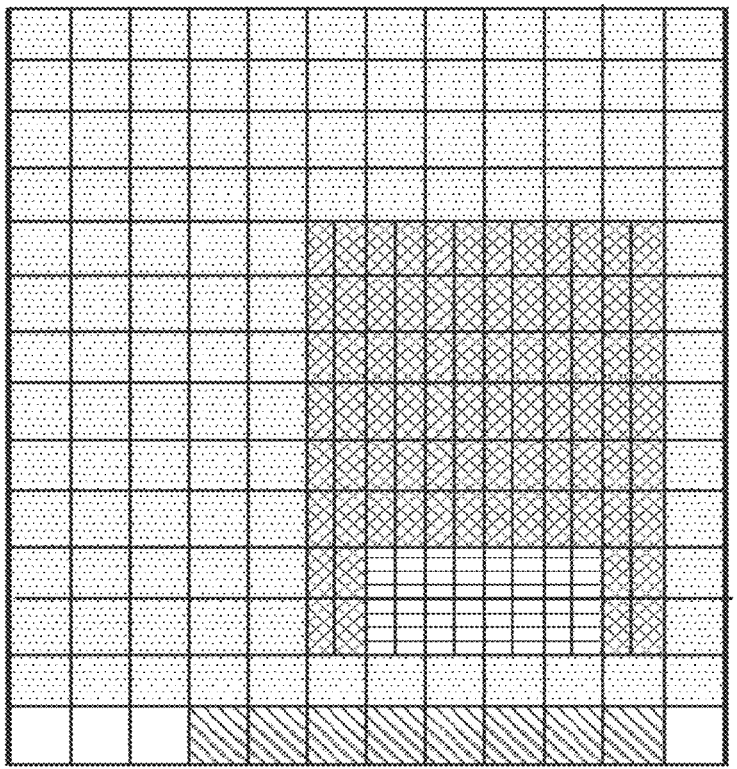
FIG. 2 is a diagram of dynamic frequency-time resource assignment.
Figure 3:
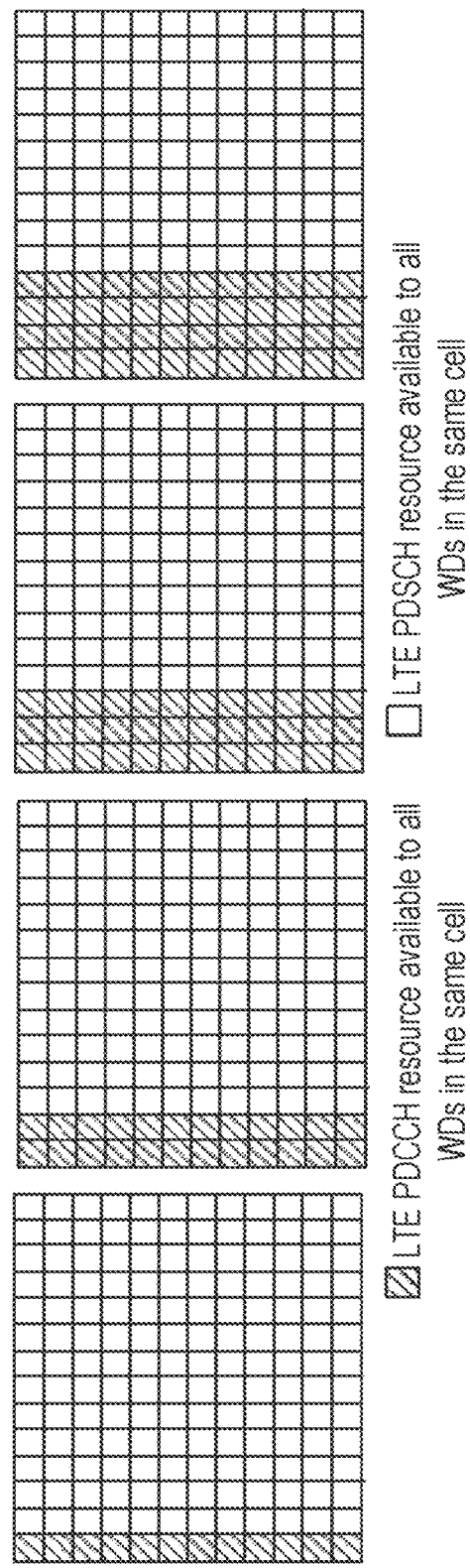
FIG. 3 is a diagram of LTE PDCCH and PDSCH allocations.

As described above, reusing existing approaches for determining resource utilization in NR is problematic, for example as illustrated in the following aspects:

At any given time, wireless devices in NR may be dynamically assigned with channels mapped to resource grids of different numerologies, as illustrated in FIG. 2. There is no well-defined unit that can facilitate the summation of frequency-time resources from different resource grids to provide a unified view of resource allocation from the cell perspective.

The definition for what is the available resources for a given channel from cell perspective becomes vague, as shown in FIG. 2. For example, when wireless device B is not being scheduled, wireless device B is configured with a PDCCH region that is actually dynamically re-used by wireless device A for its PDSCH, therefore it becomes unclear how to define the total available PDCCH resources for the cell. For example, it may or may not be reasonable to count resources: configured for wireless device A's PDCCH for a particular accounting period or configured for wireless device B's PDCCH since the resources are potentially available but just not utilized. More importantly, either approach does not provide an accurate picture of resource utilization:
  If the configured PDCCH resources of the wireless devices not scheduled are not counted towards the total available resources, the PDCCH resource utilization ratio would tend to be high, which results in a false alarm to the network operators that the PDCCH channel is getting congested.
  If the configured PDCCH resources of the wireless devices that are not scheduled are counted towards the total available resources, it becomes unclear what the corresponding total available resources for the PDSCH should be in the same counting period. It is unclear whether resources should be counted for the overlapped frequency-time resources since these resources are available to the PDSCH, otherwise these resources would not be assigned to it, but if they are counted, then the total available resources of all channels will exceed what is physically available from the cell.
The standard PRB and CCE units typically used for observability in LTE are insufficient to provide an accurate and understandable view of how a given spectrum resource is being utilized by an NR system.

The instant disclosure solves at least a portion of the problems with existing observability at least in part by providing one or more of the following:
  A new unit, RB-symbol or RBSYM, is provided as the universally valid unit for tracking frequency-time resources allocated from resource grids of different numerologies. In other words, in one or more embodiments, RBSYM is a unit that is able to represent a resource allocation for one or more layer 1 (e.g., NR layer 1) channels and signals (e.g., channels and signals based on a resource grid of OFDM signals), regardless of numerology and configuration complexity. For example, a first resource allocation according to a first numerology may be represented by a first quantity of RBSYM units while a second numerology may be represented by a second quantity of RBSYM units, where both use the same RBSYM as a universally valid unit for quantifying and/or tracking allocated frequency-time resources.
  A new methodology for accounting of resource utilization per channel is provided, such that the utilization is defined as total used resources for a channel over the total available resources of the cell, instead of in terms of what is configured to the channel. Designated counters for tracking of resource congestions of different channels can be introduced to complement the change of resource utilization definition.
  A new constant, RBSYM Spectral Factor κ_RBSym is provided, and its related method for measuring the spectral efficiency of NR physical channels is provided. This instantaneous measurements of spectral efficiency of different physical channels are valuable inputs to the flexible and dynamic control of features.

Before describing in detail exemplary embodiments, it is noted that the embodiments reside primarily in combinations of apparatus components and processing steps related to quantifying resource utilization and/or spectrum usage based on RBSYM. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments herein provide for quantifying resource utilization and/or spectrum usage based on RBSYM where RBSYM is a unit that is able to represent a resource allocation for one or more layer 1 (e.g., NR layer 1) channels and signals (e.g., channels and signals based on a resource grid of OFDM signals), regardless of numerology and configuration complexity. Layer 1 may correspond to an Open Systems Interconnection model (OSI model) layer 1 and/or may include all L1 physical channels and signals such as in the uplink and/or downlink. Some embodiments described herein may be applicable to other layers.

Figure 4:
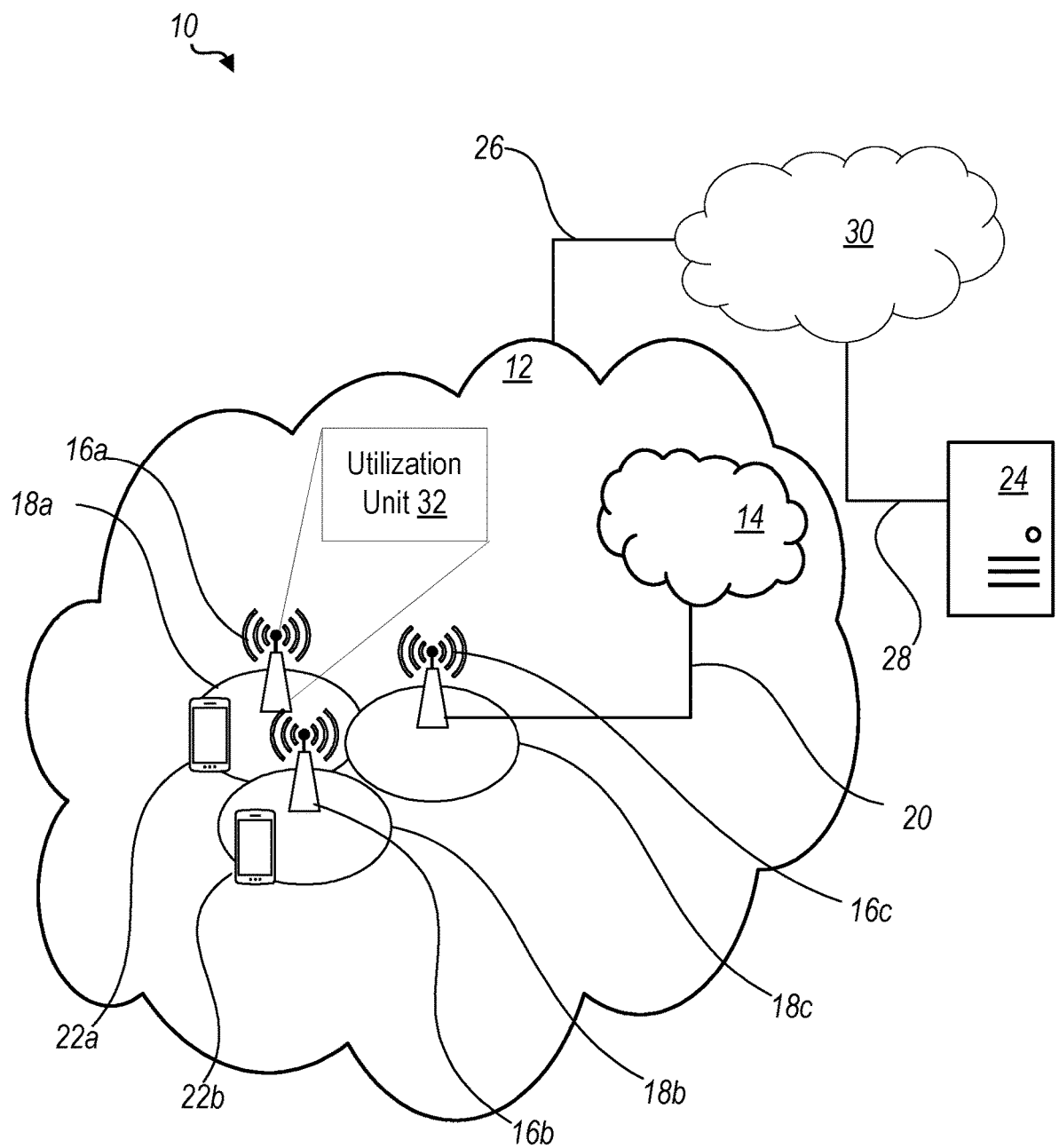
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a utilization unit 32 which is configured to perform one or more network node 16 function as described herein such as with respect to quantifying resource utilization and/or spectrum usage based on RBSYM for performing one or more actions.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, store, determine, quantify, calculate, forward, transmit, receive, relay, etc., information related to quantifying resource utilization and/or spectrum usage based on RBSYM, as described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include utilization unit 32 configured to perform one or more network node 16 functions as described herein such as with respect to quantifying resource utilization and/or spectrum usage based on RBSYM.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 5:
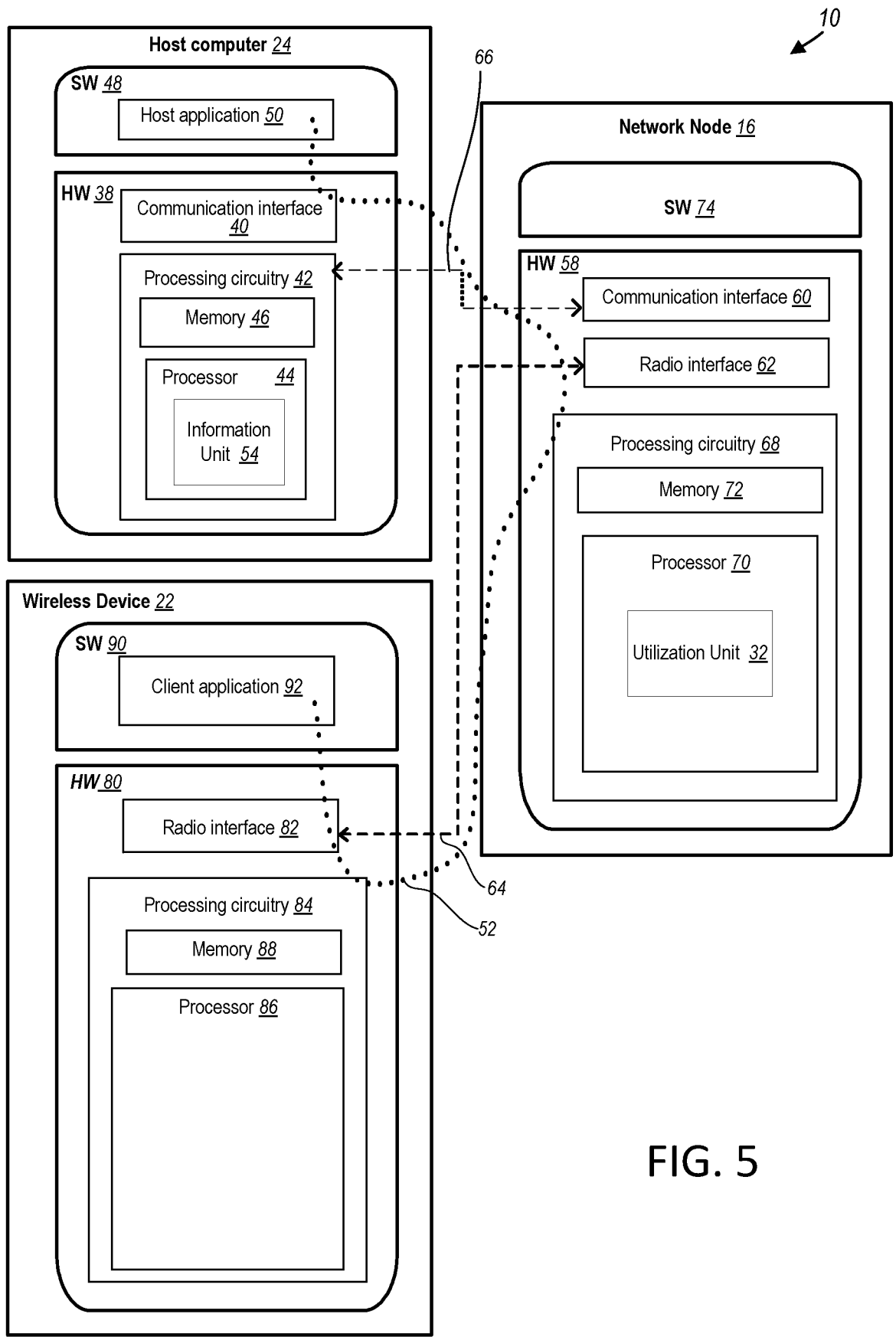
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as utilization unit 32 and information unit 54 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 8, 9:
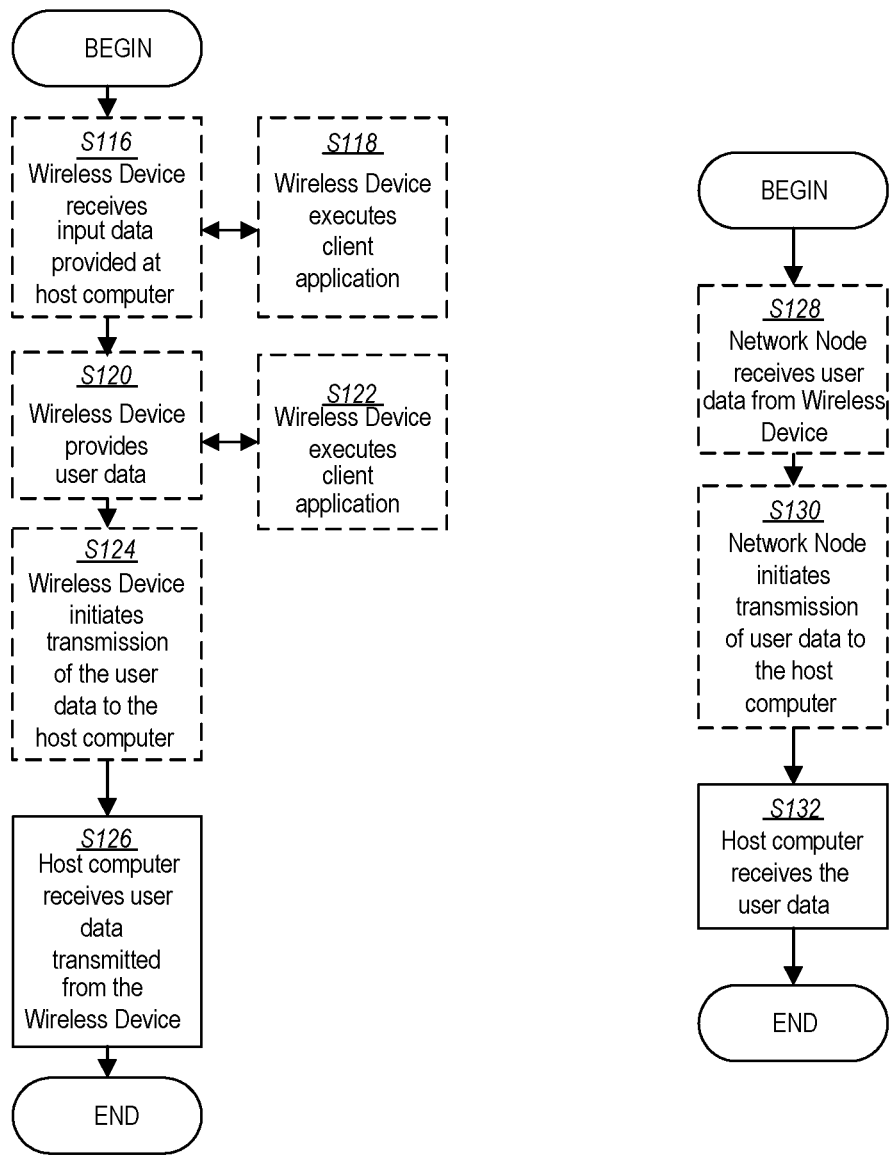
FIG. 8 is a flowchart illustrating exemplary methods implemented in a communication system including a host computer, a network node and a wireless device for receiving user data from the wireless device at a host computer according to some embodiments of the present disclosure.
FIG. 9 is a flowchart illustrating exemplary methods implemented in a communication system including a host computer, a network node and a wireless device for receiving user data at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
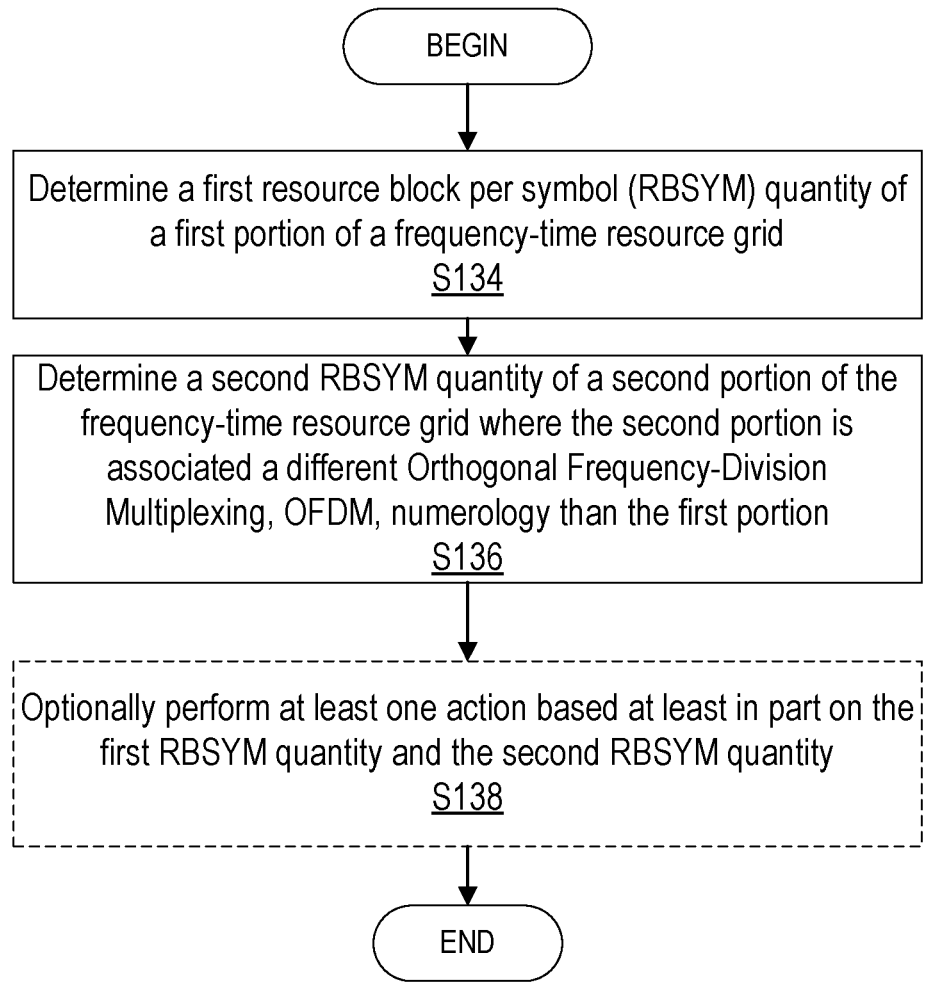
FIG. 10 is a flowchart of an exemplary process in a network node according to some embodiments of the present disclosure.

FIG. 10 is a flowchart of an exemplary process in a network node 16 according to one or more embodiments of the disclosure. One or more Blocks and/or functions performed by network node 16 may be performed by one or more elements of network node 16 such as by utilization unit 32 in processing circuitry 68, processor 70, radio interface 62, etc. In one or more embodiments, network node 16 such as via one or more of processing circuitry 68, processor 70, utilization unit 32, communication interface 60 and radio interface 62 is configured to determine (Block S134) a first resource block per symbol (RBSYM) quantity of a first portion of a frequency-time resource grid, as described herein.

In one or more embodiments, network node 16 such as via one or more of processing circuitry 68, processor 70, utilization unit 32, communication interface 60 and radio interface 62 is configured to determine (Block S136) a second RBSYM quantity of a second portion of the frequency-time resource grid where the second portion is associated with a different Orthogonal Frequency-Division Multiplexing, OFDM, numerology than the first portion, as described herein. In one or more embodiments, network node 16 such as via one or more of processing circuitry 68, processor 70, utilization unit 32, communication interface 60 and radio interface 62 is configured to optionally perform (Block S138) at least one action based at least in part on the first RBSYM quantity and the second RBSYM quantity, as described herein.

According to one or more embodiments, at least one mathematical operation is directly performed using the first RBSYM quantity and the second RBSYM quantity. According to one or more embodiments, the at least one mathematical operation includes at least one of addition and subtraction. According to one or more embodiments, the processing circuitry is further configured to convert the first RBSYM quantity to a first resource block (RB)-slot quantity and the second RBSYM quantity to a second RB-slot quantity.

According to one or more embodiments, the processing circuitry is further configured to convert the first RBSYM quantity to a first control channel element (CCE) quantity and the second RBSYM quantity to a second CCE quantity. According to one or more embodiments, the first RBSYM quantity corresponds to a first CORESET and the second RBSYM quantity corresponds to second CORESET different from the first CORESET. According to one or more embodiments, the first RBSYM quantity corresponds to one of available and used resources in physical downlink control channel, PDCCH, where the second RBSYM quantity corresponds to one of available and used resources in a physical downlink shared channel, PDSCH.

According to one or more embodiments, the first RBSYM quantity corresponds to used resources in a physical downlink shared channel, PDSCH, Type B scheduling where the second RBSYM quantity corresponds to used resources in a physical downlink control channel, PDCCH, Type B scheduling. According to one or more embodiments, the at least one action includes modifying a channel configuration to reduce congestion. According to one or more embodiments, the processing circuitry is further configured to determine a resource utilization based at least on the first RBSYM quantity and the second RBSYM quantity.

Having generally described arrangements for signalling control information for configuring at least one signal waveform characteristic, details for these arrangements, functions and processes are provided as follows, and which may be implemented by the network node 16, wireless device 22 and/or host computer 24. quantifying resource utilization and/or spectrum usage based on RBSYM.

Embodiments provide quantifying resource utilization and/or spectrum usage based on RBSYM. RB-Symbol (RBSYM) is defined as an area from the frequency-time resource grid bound by:

in the frequency domain, a RB (or 12 REs) of a given OFDM numerology; and in the time domain, a symbol of the duration that corresponds to the selected OFDM numerology that defines the frequency domain That is, RBSYM=$R_\mu \cdot S_\mu$, where $R_\mu$ is 1 Resource Block in a given OFDM numerology, in KHz; and $S_\mu$ is 1 symbol duration on the same resource grid, in ms. RB-Symbol is in the unit of KHz·ms. Table 1 illustrates examples of the resulting RB-Symbol value given various numerologies.

TABLE 1

| OFDM numerology | RB-Symbol in resource grids defined by different numerologies, normal prefix | | | |
|---|---|---|---|---|
| | Subcarrier Spacing (KHz) | $R_\mu$ (KHz) | $S_\mu$ (ms) | RB-Symbol (KHz · ms) |
| 0 | 15 | 180 | 0.0714 | 12.86 |
| 1 | 30 | 360 | 0.0357 | 12.86 |
| 2 | 60 | 720 | 0.0179 | 12.86 |
| 3 | 120 | 1440 | 0.0089 | 12.86 |
| 4 | 240 | 2880 | 0.0045 | 12.86 |

As illustrated in Table 1 above, for all 3GPP defined OFDM numerologies, RB-Symbol (RBSYM) is a constant in all resource grids with normal cyclic prefix, and since the assignable resources during the operation is always an integer multiple of RBs in frequency domain and symbols in time domain, it makes RB-Symbol the common unit for keeping track of frequency-time domain resources assigned to different wireless devices 22 within the same cell, potentially based on different resource grids defined by different OFDM numerologies. For example, in one or more embodiments, RBSYM is a unit that is configured to represent a resource allocation for one or more layer 1 (e.g., NR layer 1) channels and signals (e.g., channels and signals based on a resource grid of OFDM signals), regardless of numerology and configuration complexity.

Within an NR system, the entire spectrum usage counter infrastructure can be built around this observability unit, i.e., RB-Symbol unit.

Resources tracked in RB-Symbols can be converted to RB-Slot by dividing by 14, which is number of symbols in a slot for normal cyclic prefix configuration. RB-Slot is equivalent to the legacy unit in LTE for resource tracking, thereby allowing for comparison of resource usage between 4G and 5G technologies.

Further, the RB-Symbol can be converted to CCE for downlink control channel for comparing usage against LTE.

Reference signals such as TRS and CSI-RS usage can be aggregated and described using RB-Symbol with little error, especially when aggregated over a normal collection period of 1 second.

NR supports arbitrary TDD configurations at symbol level flexibility in the time domain where RB-Symbol may be used to describe the DL and UL total available physical resources; furthermore, allocations of all NR physical channels such as PDCCH, PDSCH and PUSCH can also be described in integer multiples of RB-Symbols, at least in part since the resulting resource utilization KPI for different channels can be derived as the percentage of channel allocation in RB-Symbol out of total available physical resources in RB-Symbol for the same time period.

A constant, RBSYM Spectral Factor κ_RBSym, may be defined as $\kappa_{RBSym}$=12.857143 . . . Hz·sec/RBSym The spectral efficiency of a physical channel, e.g., channel_A, can be determined by using the following formula The Spectral Efficiency$_{ch\_A}$ =

$$\frac{\text{The Data(in bits)transmitted by ch\_A}}{(\text{The number of } RBSYM \text{ used by ch\_A}) \times \kappa_{RBSym}} (\text{bits/Hz/sec})$$

Example 1: Case of Flexible PDCCHs and PDSCHs

Figure 11:
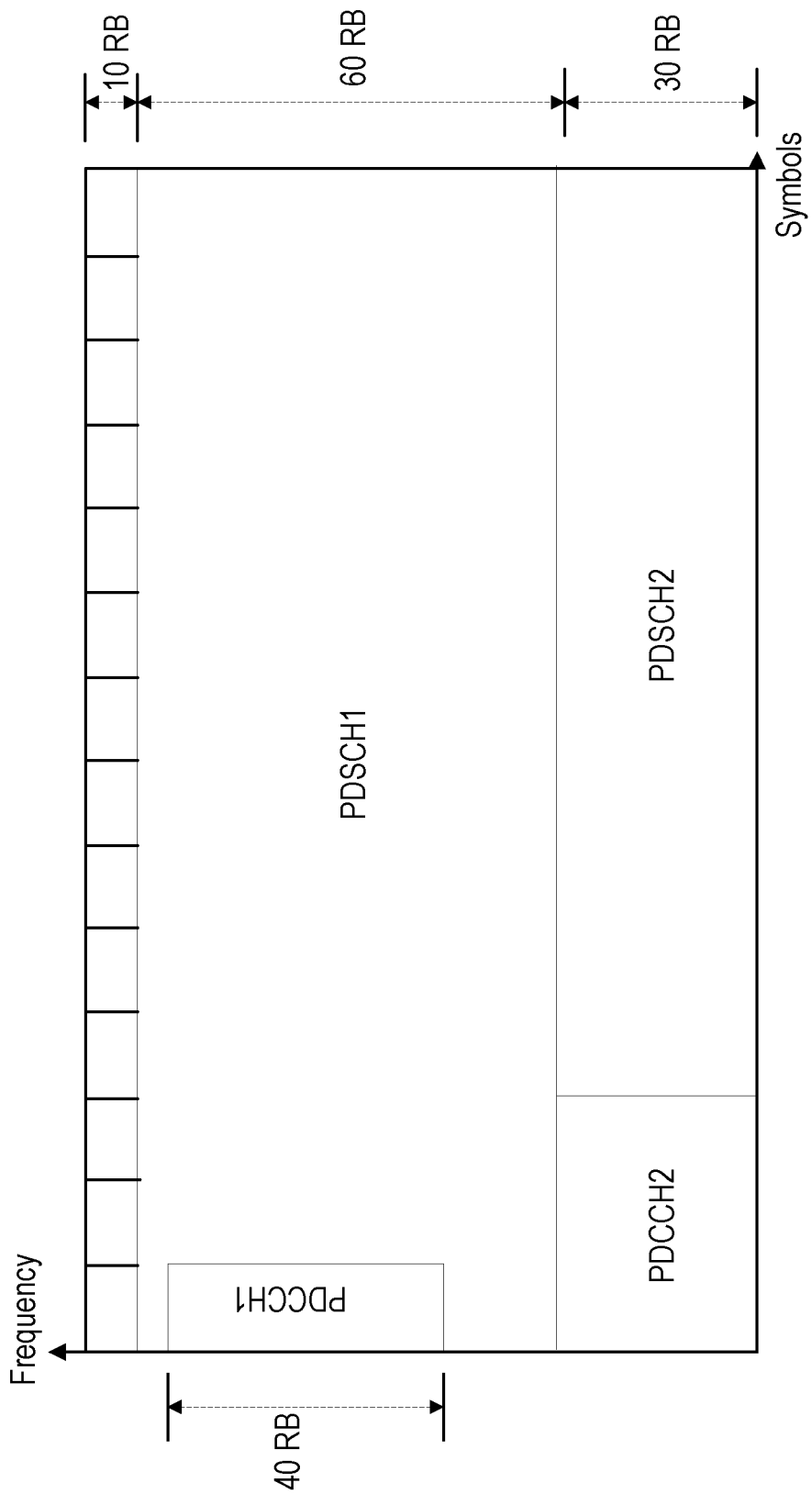
FIG. 11 is a diagram of an example with flexible PDCCHs and PDSCHs.

FIG. 11 is a diagram of an example of flexible PDCCHs and PDSCHs in a slot. In particular, as illustrated in FIG. 11, there are 100 RB×14 Symbols=1400 RBSYM of total DL resources (i.e., total resources in a frequency-time grid), 40 RB×1 Symbol=40 RBSYM used by PDCCH1, 30 RB×3 Symbol=90 RBSYM used by PDCCH2, 60 RB×14 Symbol–40 RBSYM=800 RBSYM used by PDSCH1 and 30 RB×11 Symbol=330 RBSYM used by PDSCH2. Therefore, total DL resources and usage per, for example, physical channel can be determined in terms of RBSYM (i.e., RB-Symbol) where a mathematical operation (e.g., addition, subtraction) can be performed on the RBSYM values even though different numerologies are used in FIG. 11.

Example 2: Case of Mini-Slot

Figure 12:
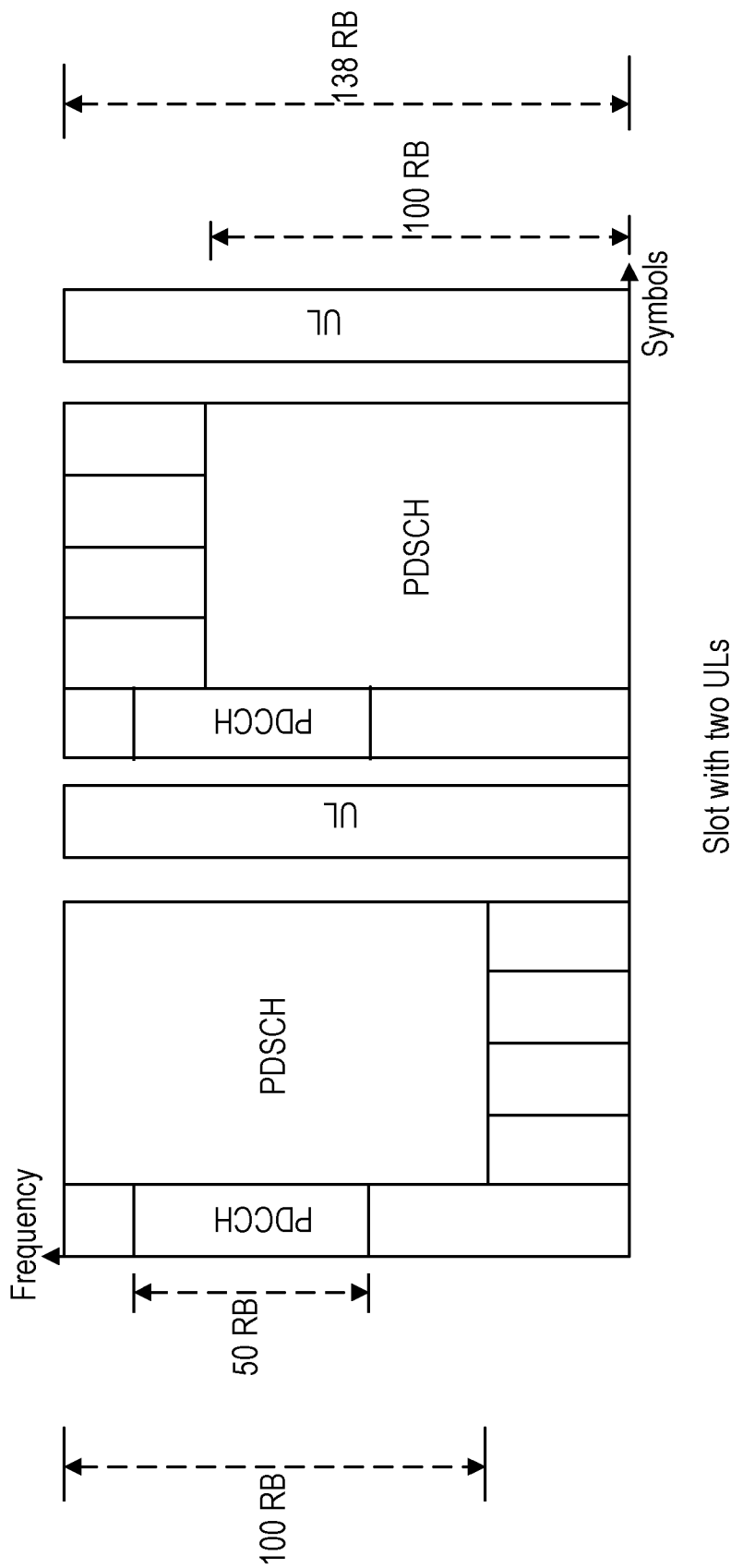
FIG. 12 is a diagram of an example with a mini-slot.

FIG. 12 is a diagram of an example of a mini-slot with 2 UL. As illustrated in FIG. 12, there are 138 RB×10 Symbol=1380 RBSYM of DL available resources, 138 RB×2 Symbol=276 RBSYM of UL available resources, 138 RB×2 Symbol=276 RBSYM of unusable resources,(gap), 50 RB×2 Symbol=100 RBSYM used by PDCCH, 100 RB×8 Symbol=800 RBSYM used by PDSCH, and 138 RB×2 Symbol=276 RBSYM of used UL resources. Therefore, available, used and unusable resources are determined in terms of RBSYM (i.e., RB-Symbol).

Example 3: Case of Flexible CORSETs and PDCCHs

Figure 13:
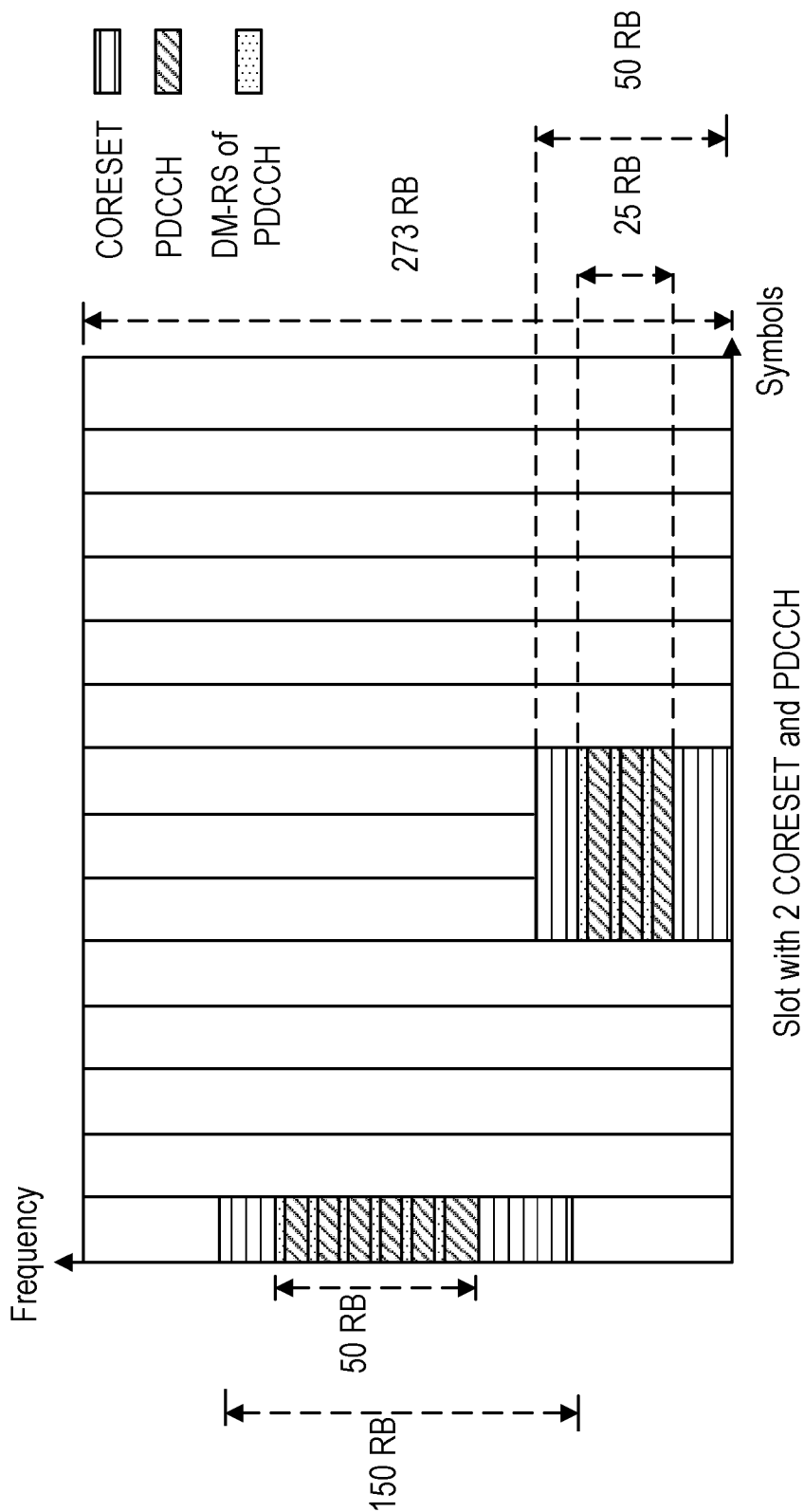
FIG. 13 is a diagram of an example with flexible CORESETs and PDCCHs.

FIG. 13 is a diagram that illustrates an example of flexible CORSETs and PDCCHs. Using RBSYM described herein, CORSET1 is configured with 150 RBSYM, CORSET2 is configured with 50 RB×3 Symbol=150 RBSYM, PDCCH1 uses 50 RBSYM, and PDCCH2 uses 25 RB×3 Symbol=75 RBSYM. Therefore, CORSETs and PDCCH can be described in terms of RBSYM.

Example 4: Case of Long PUCCH

Figure 14:
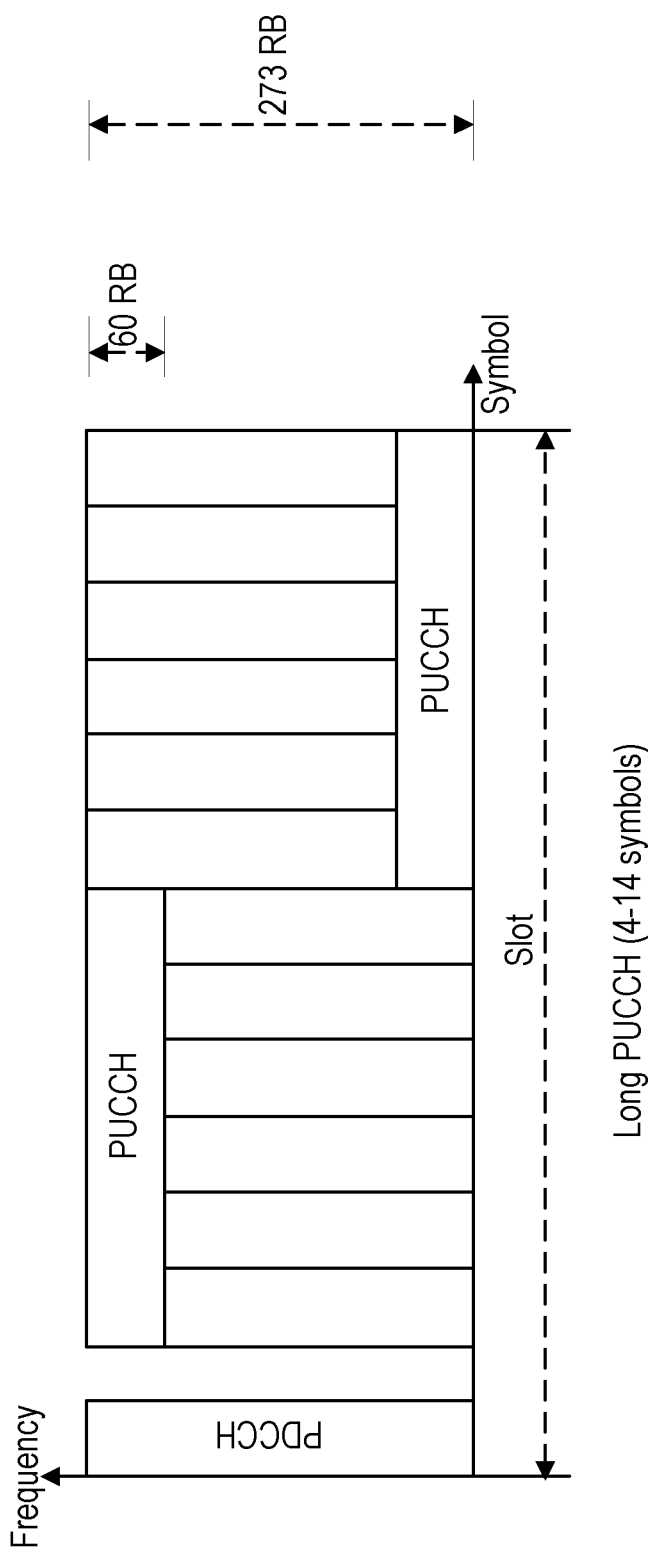
FIG. 14 is a diagram of an example with long PUCCH.

FIG. 14 is a diagram of an example of long PUCCH. Using RBSYM described herein, the PDCCH uses 273 RBSYM, the PUCCH uses 60 RB×(6+6)Symbol=720 RBSYM, and there are 273 RBSYM of unusable resources (gap). Hence, long PUCCH can be described in terms of RBSYM.

Example 5: Case of Low Latency in NR

Figure 15:
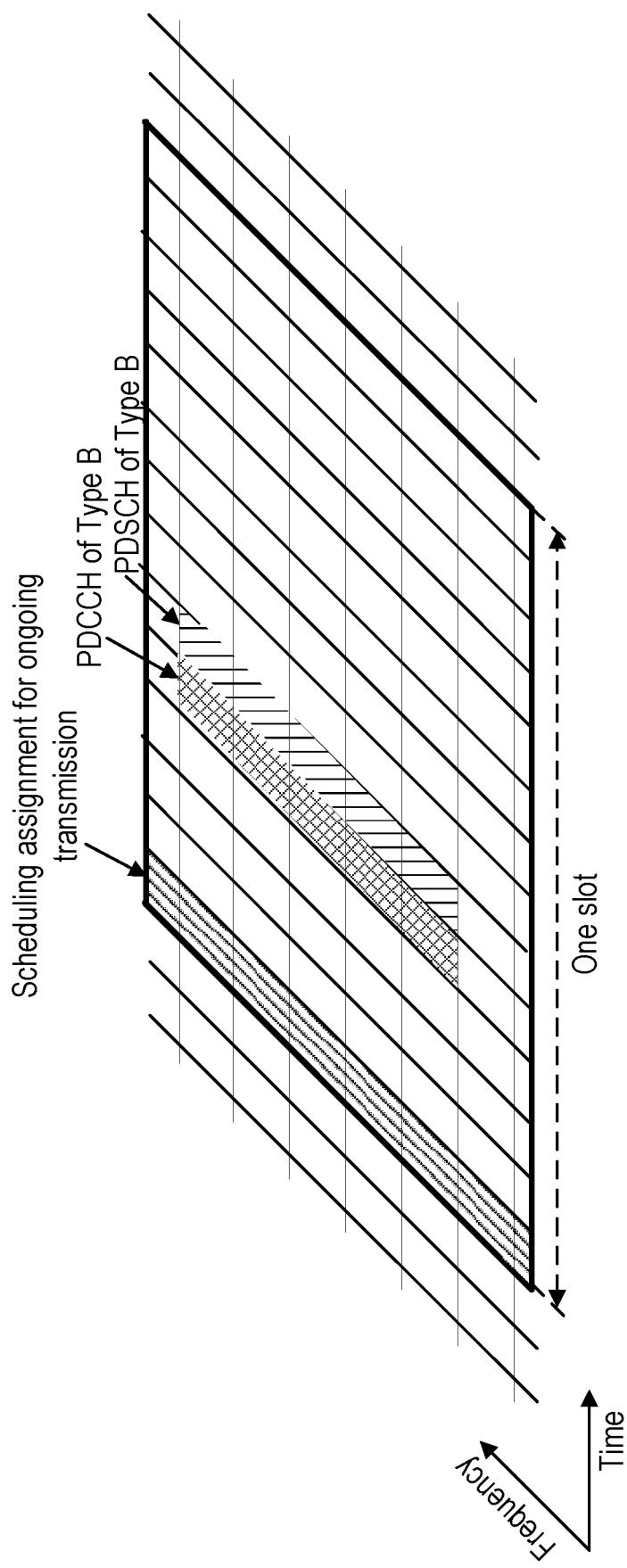
FIG. 15 is a diagram of an example with low latency in NR (Type B scheduling).

FIG. 15 is a diagram of Type B scheduling with low latency in NR. PDSCH Type B (also valid for PUSCH) can start at any symbol in slot to enable rapid transmission when needed. In FIG. 15, the PDCCH of Type B has used 4 RBSYM, and the PDSCH of Type B has used 4 RBSYM. Therefore, Type B scheduling and/or other low latency configurations in NR can be quantified in terms of RBSYM.

The various examples above show the effectiveness and efficiency in measuring the utilization of resources in terms of RBSYM or a derivation of RBSYM. Further, the network node 16 may perform one or more actions based at least in part on the determined one or more metrics that are quantified in units of RBSYM. For example, the network node 16 may trigger an alarm that the system is congested or becoming congested such as if the quantity of RBSYMs is above a predefined threshold that is indicative of network and/or communication link congestion.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
processing circuitry configured to:
  determine a first resource block per symbol, RBSYM, quantity of a first portion of a frequency-time resource grid;
  determine a second RBSYM quantity of a second portion of the frequency-time resource grid, the second portion being associated a different Orthogonal Frequency-Division Multiplexing, OFDM, numerology than the first portion; and
  perform at least one action based at least in part on the first RBSYM quantity and the second RBSYM quantity.

2. The network node of claim 1, wherein at least one mathematical operation is directly performed using the first RBSYM quantity and the second RBSYM quantity.

3. The network node of claim 2, wherein the at least one mathematical operation includes at least one of addition and subtraction.

4. The network node of claim 1, wherein the processing circuitry is further configured to convert the first RBSYM quantity to a first resource block, RB,-slot quantity and the second RBSYM quantity to a second RB-slot quantity.

5. The network node of claim 1, wherein the processing circuitry is further configured to convert the first RBSYM quantity to a first control channel element, CCE, quantity and the second RBSYM quantity to a second CCE quantity.

6. The network node of claim 1, wherein the first RBSYM quantity corresponds to a first CORESET and the second RBSYM quantity corresponds to second CORESET different from the first CORESET.

7. The network node of claim 1, wherein the first RBSYM quantity corresponds to available resources or used resources in physical downlink control channel, PDCCH; and
the second RBSYM quantity corresponds to available resources or used resources in a physical downlink shared channel, PDSCH.

8. The network node of claim 1, wherein the first RBSYM quantity corresponds to used resources in a physical downlink shared channel, PDSCH, Type B scheduling; and
the second RBSYM quantity corresponds to used resources in a physical downlink control channel, PDCCH, Type B scheduling.

9. The network node of claim 1, wherein the action includes modifying a channel configuration to reduce congestion.

10. The network node of claim 1, wherein the processing circuitry is further configured to determine a resource utilization based at least on the first RBSYM quantity and the second RBSYM quantity.

11. A method implemented in a network node, the method comprising:
  determining a first resource block per symbol, RBSYM, quantity of a first portion of a frequency-time resource grid;
  determining a second RBSYM quantity of a second portion of the frequency-time resource grid, the second portion being associated a different Orthogonal Frequency-Division Multiplexing, OFDM, numerology than the first portion; and
  performing at least one action based at least in part on the first RBSYM quantity and the second RBSYM quantity.

12. The method of claim 11, wherein at least one mathematical operation is directly performed using the first RBSYM quantity and the second RBSYM quantity.

13. The method of claim 12, wherein the at least one mathematical operation includes at least one of addition and subtraction.

14. The method of claim 11, further comprising converting the first RBSYM quantity to a first resource block, RB,-slot quantity and the second RBSYM quantity to a second RB-slot quantity.

15. The method of claim 11, further comprising converting the first RBSYM quantity to a first control channel element, CCE, quantity and the second RBSYM quantity to a second CCE quantity.

16. The method of claim 11, wherein the first RBSYM quantity corresponds to a first CORESET and the second RBSYM quantity corresponds to second CORESET different from the first CORESET.

17. The method of claim 11, wherein the first RBSYM quantity corresponds to available resources or used resources in physical downlink control channel, PDCCH; and
the second RBSYM quantity corresponds to available resources or used resources in a physical downlink shared channel, PDSCH.

18. The method of claim 11, wherein the first RBSYM quantity corresponds to used resources in a physical downlink shared channel, PDSCH, Type B scheduling; and
the second RBSYM quantity corresponds to used resources in a physical downlink control channel, PDCCH, Type B scheduling.

19. The method of claim 11, wherein the action includes modifying a channel configuration to reduce congestion.

20. The method of claim 11, further comprising determining a resource utilization based at least on the first RBSYM quantity and the second RBSYM quantity.

* * * * *